US00RE45547E

(19) United States
(12) Reissued Patent
Andre et al.

(10) Patent Number: US RE45,547 E
(45) Date of Reissued Patent: Jun. 9, 2015

(54) ELECTRONIC DEVICE

(75) Inventors: Bartley K. Andre, Menlo Park, CA (US); Daniel J. Coster, San Francisco, CA (US); Daniele De Iuliis, San Francisco, CA (US); Richard P. Howarth, San Francisco, CA (US); Jonathan P. Ive, San Francisco, CA (US); Steve Jobs, Palo Alto, CA (US); Bruce H. Waltrous, Jr., legal representative, Cupertino, CA (US); Duncan Robert Kerr, San Francisco, CA (US); Shin Nishibori, San Francisco, CA (US); Matthew Dean Rohrbach, San Francisco, CA (US); Douglas B. Satzger, Menlo Park, CA (US); Calvin Q. Seid, Palo Alto, CA (US); Vincent Keane Seid, legal representative, Los Gatos, CA (US); Christopher J. Stringer, Woodside, CA (US); Eugene Antony Whang, San Francisco, CA (US)

(73) Assignee: Apple Inc., Cupertino, CA (US)

(21) Appl. No.: 29/366,469

(22) Filed: Jul. 26, 2010

Related U.S. Patent Documents

Reissue of:
(64) Patent No.: Des. 532,011
Issued: Nov. 14, 2006
Appl. No.: 29/208,332
Filed: Jun. 24, 2004

U.S. Applications:
(62) Division of application No. 29/327,929, filed on Nov. 14, 2008, which is an application for the reissue of Pat. No. Des. 532,011.

(51) LOC (10) Cl. ..... 14-02
(52) U.S. Cl.
USPC ..... D14/375
(58) Field of Classification Search
USPC ..... D14/371–376, 125, 129, 356, 336, 334, D14/335, 337, 439, 447, 448, 450, 451, 452, D14/126; 248/917–924, 371, 157, 176.1, 248/278.1; 341/12; 345/104, 156, 173, 174, 345/901–905; 348/180, 184, 325, 739; 349/1, 2, 11, 62

See application file for complete search history.

(56) References Cited

U.S. PATENT DOCUMENTS

| | | | | | |
|---|---|---|---|---|---|
| D289,873 | S | | 5/1987 | Gemmell et al. | D14/374 |
| D294,262 | S | * | 2/1988 | Thies et al. | D14/375 |
| D333,574 | S | * | 3/1993 | Ackeret | D6/300 |
| D355,897 | S | * | 2/1995 | Nakanishi et al. | D14/373 |
| D356,078 | S | * | 3/1995 | Usui et al. | D14/126 |
| D356,081 | S | * | 3/1995 | Naito et al. | D14/129 |
| D356,555 | S | * | 3/1995 | Takemasa et al. | D14/374 |
| D422,575 | S | * | 4/2000 | Tikhonski et al. | D14/374 |
| D428,415 | S | * | 7/2000 | Shibata | D14/356 |
| D432,101 | S | * | 10/2000 | Oba | D14/126 |
| D434,763 | S | | 12/2000 | Jobs et al. | D14/375 |
| D453,022 | S | * | 1/2002 | Oba | D14/374 |
| D456,023 | S | | 4/2002 | Andre et al. | D14/375 |
| D458,252 | S | * | 6/2002 | Palm et al. | D14/343 |
| D464,049 | S | * | 10/2002 | Goto | D14/374 |
| D475,048 | S | * | 5/2003 | Wu et al. | D14/374 |
| D476,335 | S | * | 6/2003 | Miao et al. | D14/375 |
| D486,486 | S | | 2/2004 | Jobs et al. | D14/371 |
| D487,893 | S | | 3/2004 | Jobs et al. | D14/371 |
| D488,139 | S | * | 4/2004 | Takami et al. | D14/126 |
| D489,370 | S | | 5/2004 | Jobs et al. | D14/371 |
| D490,810 | S | * | 6/2004 | Huang | D14/374 |
| D491,901 | S | * | 6/2004 | Chin et al. | D14/126 |
| D494,971 | S | | 8/2004 | Jobs et al. | D14/371 |
| D495,332 | S | | 8/2004 | Jobs et al. | D14/371 |
| D496,040 | S | | 9/2004 | Jobs et al. | D14/371 |
| D497,362 | S | * | 10/2004 | Wang et al. | D14/371 |
| D504,889 | S | | 5/2005 | Andre et al. | D14/341 |
| D529,026 | S | * | 9/2006 | Yang | D14/371 |
| 2003/0189155 | A1 | * | 10/2003 | Serbinski et al. | 248/371 |

OTHER PUBLICATIONS

U.S. Appl. No. 29/208,301, filed Jun. 24, 2004.

* cited by examiner (new)

(new)

*Primary Examiner* — Deanna L Pratt
(74) *Attorney, Agent, or Firm* — SAIDMAN DesignLaw Group

(57) CLAIM

We claim the ornamental design for a electronic device, substantially as shown and described.

DESCRIPTION

*Notice: More than one reissue application has been filed for the reissue of Pat. No. D532,011. The reissue applications are application numbers 29/366,469 (the present application), 29/327,929, filed Nov. 14, 2008, 29/366,475 filed Jul. 26, 2010, 29/366,476 filed Jul. 26, 2010, 29/366,477 filed Jul. 26, 2010, 29/366,480 filed Jul. 26, 2010, and 29/366,481 filed Jul. 26, 2010, all of which are divisional reissues of Pat. No. D532,011.*

*This is a reissue application of our prior U.S. Pat. No. D532, 011, having an issue date of Nov. 14, 2006, the entirety of which is expressly incorporated herein by reference.*

[FIG. 1 is a front perspective view of an electronic device in accordance with the present design. The electronic device may correspond to a display device or computer that incorporates a processor and a display device into a single housing;]

[FIG. 2 is a rear perspective view thereof;]

[FIG. 3 is a front view thereof;]

[FIG. 4 is a rear view thereof;]

[FIG. 5 is a top view thereof;]

[FIG. 6 is a bottom view thereof;]

[FIG. 7 is a right side view thereof; and,]

[FIG. 8 is a left side view thereof.]

*FIG. 9 is a front perspective view of an electronic device showing our new design;*

*FIG. 10 is a rear perspective view thereof;*

*FIG. 11 is a front view thereof;*

*FIG. 12 is a rear view thereof;*

*FIG. 13 is a top view thereof;*

*FIG. 14 is a bottom view thereof;*

*FIG. 15 is a right side view thereof; and,*

*FIG. 16 is a left side view thereof.*

[The broken lines are shown in the views for illustrative purposes only and form no part of the claimed design.]

*The broken lines illustrate environmental structure and form no part of the claimed design.*

1 Claim, 10 Drawing Sheets

---

Matter enclosed in heavy brackets [ ] appears in the original patent but forms no part of this reissue; matter printed in italics indicates the additions made by reissue.

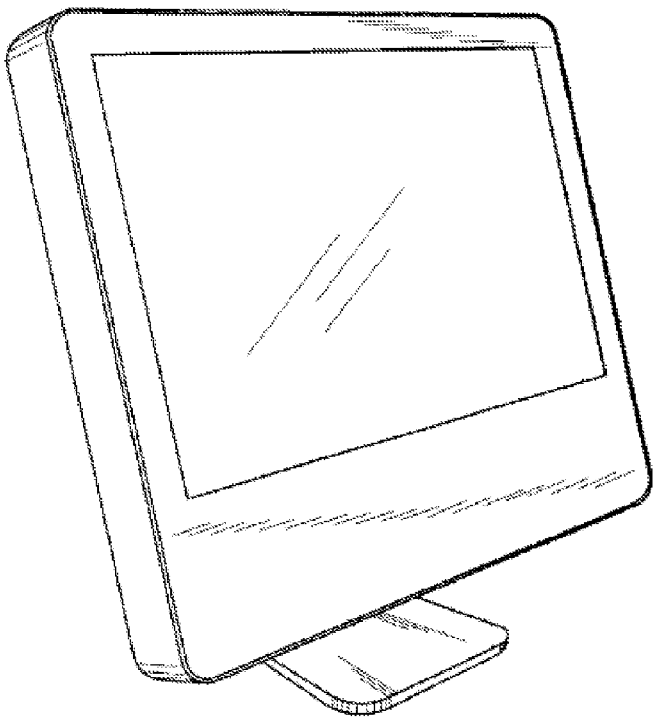
*Fig. 1 (canceled)*

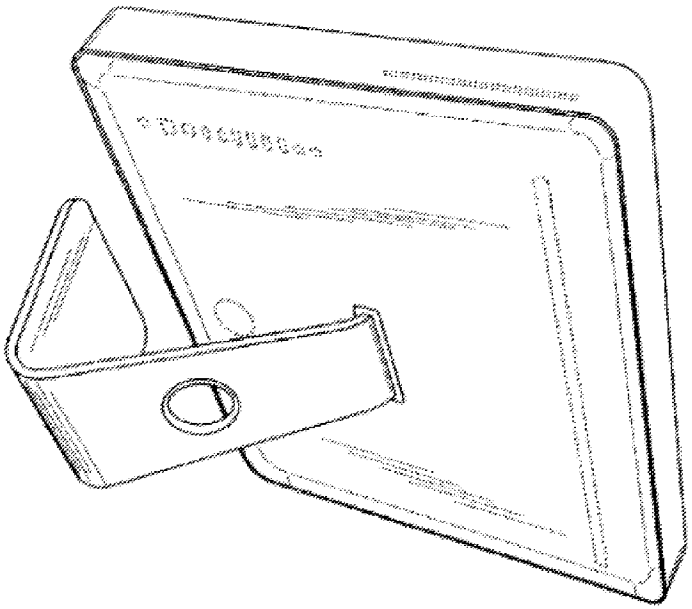
*Fig. 2 (canceled)*

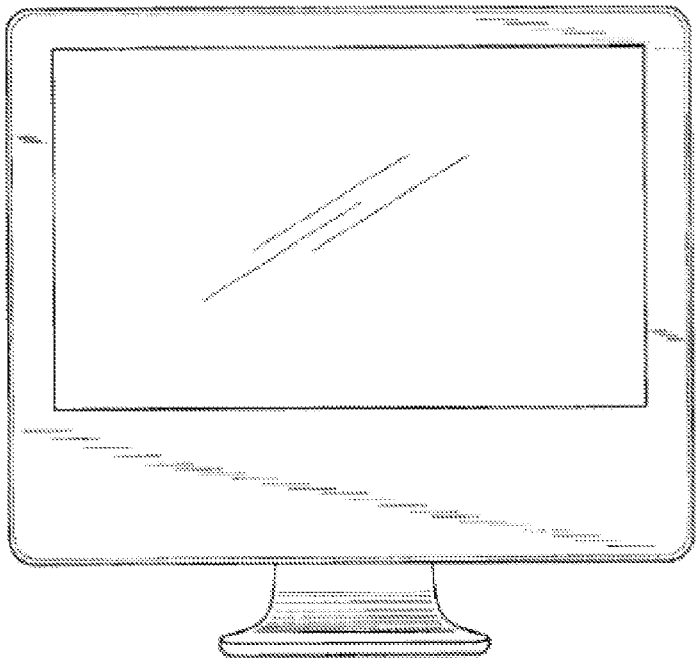
*Fig. 3 (canceled)*

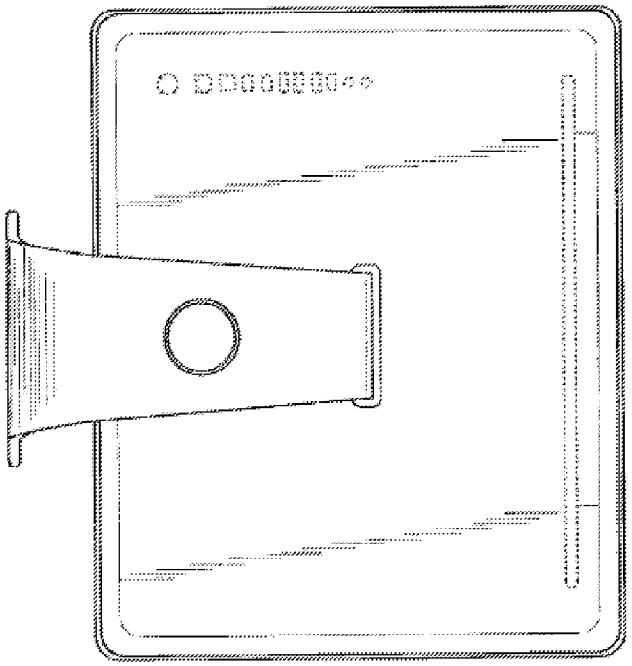
*Fig. 4 (canceled)*

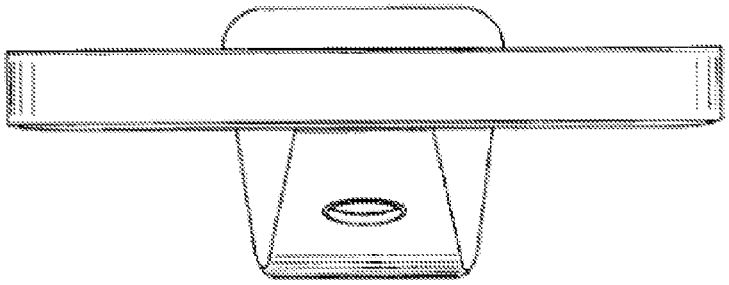
*Fig. 5 (canceled)*
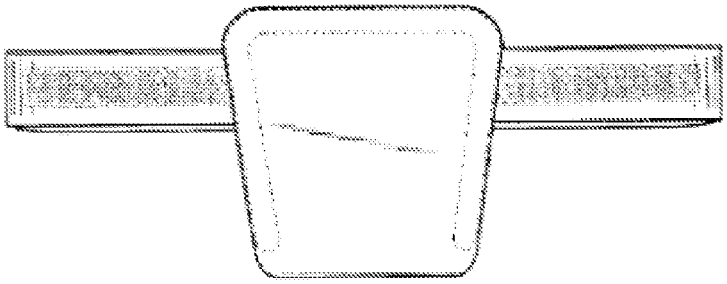
*Fig. 6 (canceled)*

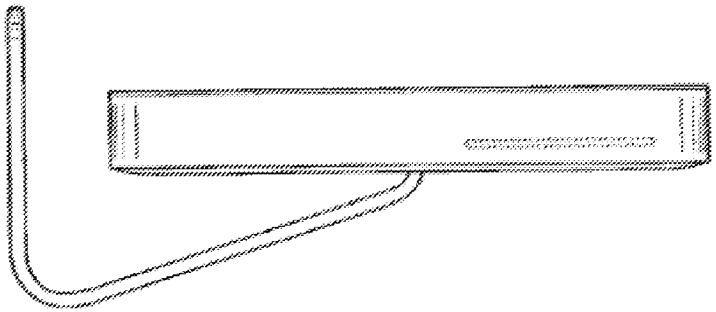
*Fig. 7 (canceled)*

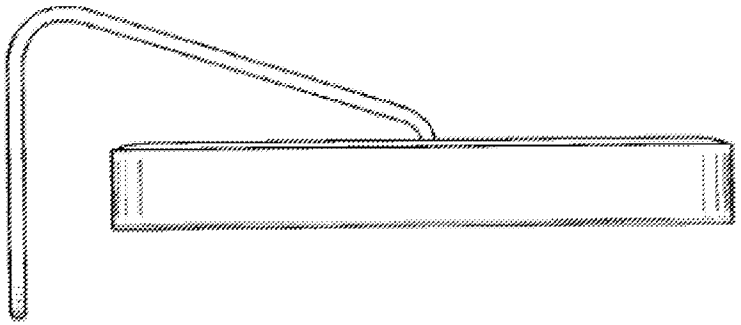
*Fig. 8 (canceled)*

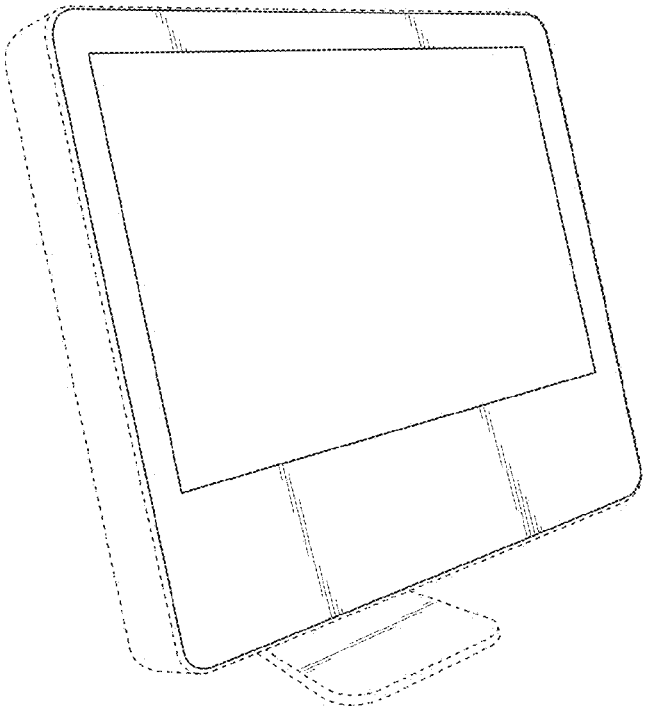
Fig. 9 (new)
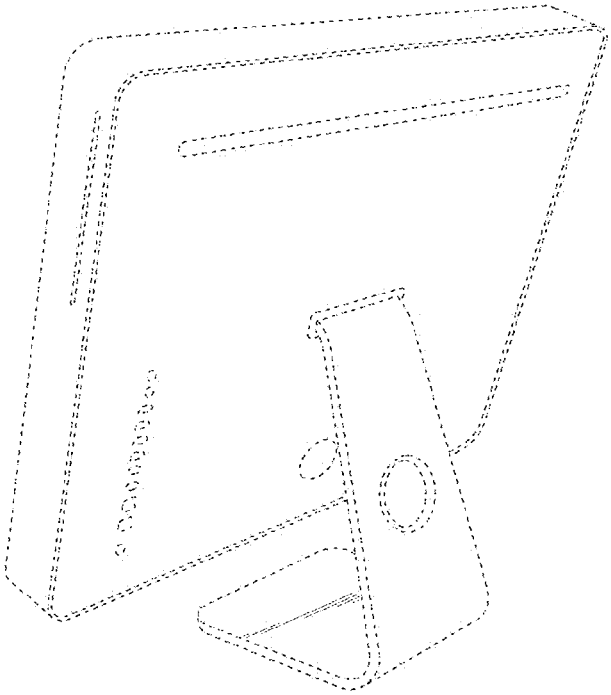
Fig. 10 (new)

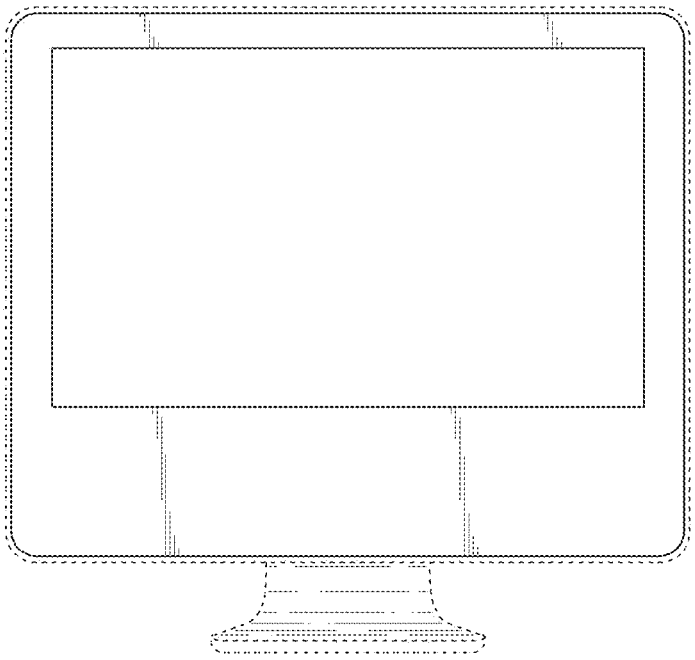
Fig. 11 (new)
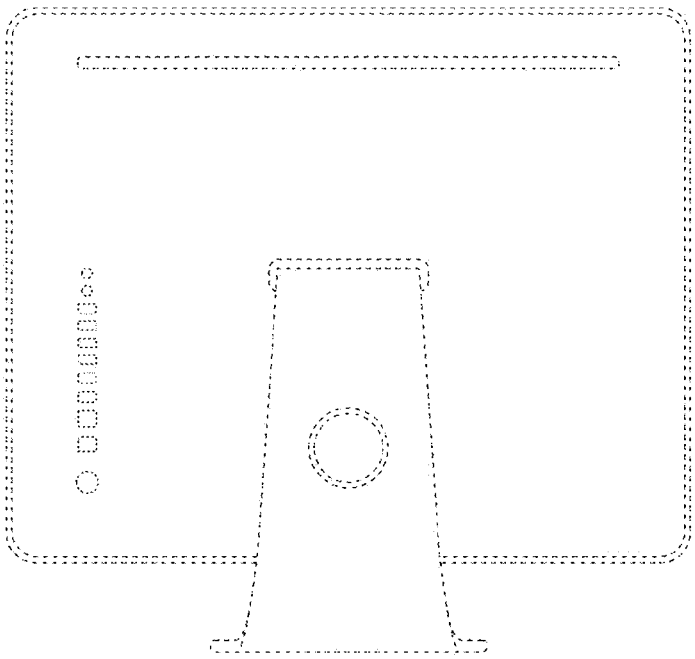
Fig. 12 (new)

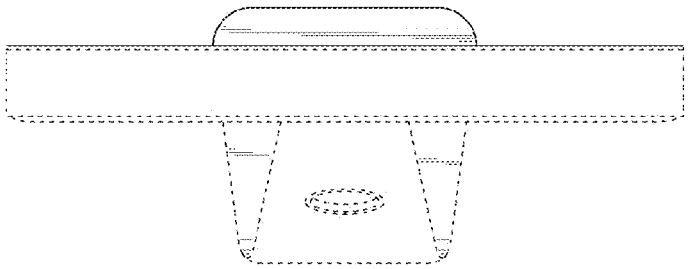
Fig. 13 (new)
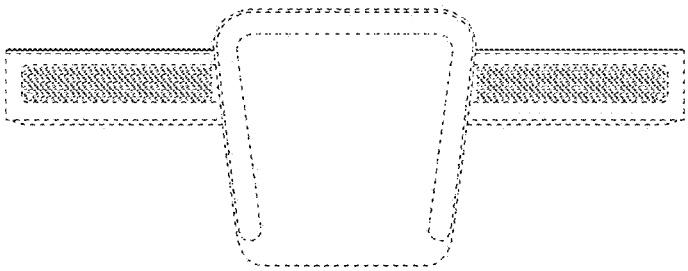
Fig. 14 (new)
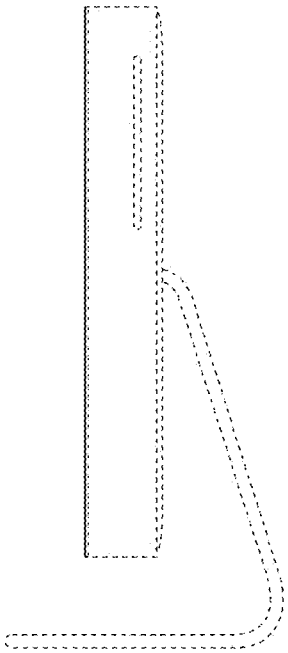
Fig. 15 (new)
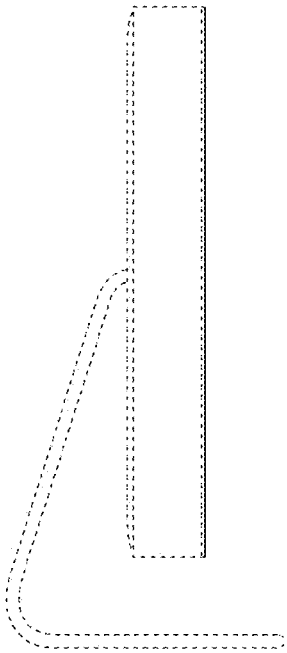
Fig. 16 (new)